US007589901B2

(12) United States Patent  
DeJong et al.

(10) Patent No.: US 7,589,901 B2
(45) Date of Patent: Sep. 15, 2009

(54) SUBSTRATE-GUIDED RELAYS FOR USE WITH SCANNED BEAM LIGHT SOURCES

(75) Inventors: Christian Dean DeJong, Sammamish, WA (US); Karlton D. Powell, Lake Stevens, WA (US); Mark O. Freeman, Snohomish, WA (US); Joshua O. Miller, Woodinville, WA (US)

(73) Assignee: Microvision, Inc., Redmond, WA (US)

( * ) Notice: Subject to any disclaimer, the term of this patent is extended or adjusted under 35 U.S.C. 154(b) by 247 days.

(21) Appl. No.: 11/775,511

(22) Filed: Jul. 10, 2007

(65) Prior Publication Data

US 2009/0015929 A1 Jan. 15, 2009

(51) Int. Cl.
*G02B 27/00* (2006.01)
*G02B 6/26* (2006.01)
(52) U.S. Cl. .................. 359/630; 359/618; 359/796; 351/158; 385/39
(58) Field of Classification Search .................. 359/359, 359/618, 629–633, 639–640, 732, 741, 796–797
See application file for complete search history.

(56) References Cited

U.S. PATENT DOCUMENTS

| 4,387,297 | A | | 6/1983 | Swartz |
| 4,997,261 | A | * | 3/1991 | Taniura ....................... 359/495 |
| 5,266,788 | A | | 11/1993 | Yamazaki |
| 6,023,372 | A | | 2/2000 | Spitzer et al. |
| 6,084,724 | A | * | 7/2000 | Wiegand et al. ............. 359/796 |
| 6,129,439 | A | | 10/2000 | Hou et al. |
| 6,140,979 | A | | 10/2000 | Gerhard et al. |
| 6,245,590 | B1 | | 6/2001 | Wine et al. |
| 6,285,489 | B1 | | 9/2001 | Helsel |
| 6,331,909 | B1 | | 12/2001 | Dunfield |
| 6,362,912 | B1 | | 3/2002 | Lewis |
| 6,384,406 | B1 | | 5/2002 | Wine |
| 6,390,370 | B1 | | 5/2002 | Plesko |
| 6,404,550 | B1 | * | 6/2002 | Yajima ....................... 359/487 |

(Continued)

FOREIGN PATENT DOCUMENTS

EP 0559406 9/1993

(Continued)

OTHER PUBLICATIONS

Amitai, Yaakov et al., "P-27: A Two-Dimensional Aperture Expander for Ultra-Compact, High-Performance Head-Worn Displays", *SID International Symposium*. Boston MA. May 24-27, 2005. vol. 36 May 24, 2005, 360-363.

*Primary Examiner*—Jordan M. Schwartz
(74) *Attorney, Agent, or Firm*—Kevin D. Wills

(57) ABSTRACT

Substrate-guided relays that employ light guiding substrates to relay images from sources to viewers in optical display systems. The substrate-guided relays are comprised of an input coupler, an intermediate substrate, and an output coupler. In some embodiments, the output coupler is formed in a separate substrate that is coupled to the intermediate substrate. The output coupler may be placed in front of or behind the intermediate substrate, and may employ two or more partially reflective surfaces to couple light from the coupler. In some embodiments, the input coupler is coupled to the intermediate substrate in a manner that the optical axis of the input coupler intersects the optical axis of the intermediate substrate at a non-perpendicular angle.

31 Claims, 18 Drawing Sheets

U.S. PATENT DOCUMENTS

| | | |
|---|---|---|
| 6,433,907 B1 | 8/2002 | Lippert |
| 6,512,622 B2 | 1/2003 | Wine |
| 6,515,278 B2 | 2/2003 | Wine |
| 6,515,781 B2 | 2/2003 | Lewis |
| 6,525,310 B2 | 2/2003 | Dunfield |
| 6,577,411 B1 | 6/2003 | David |
| 6,710,902 B2 | 3/2004 | Takeyama |
| 6,829,095 B2 | 12/2004 | Amitai |
| 6,833,955 B2 | 12/2004 | Niv |
| 7,021,777 B2 | 4/2006 | Amitai |
| 7,158,306 B1 * | 1/2007 | Cobb ..................... 359/618 |
| 2002/0141026 A1 | 10/2002 | Wiklof |
| 2005/0253055 A1 | 11/2005 | Sprague |
| 2006/0132914 A1 | 6/2006 | Weiss et al. |
| 2006/0291021 A1 | 12/2006 | Mukawa |
| 2007/0008624 A1 * | 1/2007 | Hirayama ................ 359/630 |
| 2007/0091445 A1 * | 4/2007 | Amitai ..................... 359/630 |

FOREIGN PATENT DOCUMENTS

| | | |
|---|---|---|
| FR | 2681702 | 3/1993 |
| FR | 2866442 | 8/2005 |
| WO | WO-03/081320 | 10/2003 |
| WO | WO-2005/104566 | 11/2005 |
| WO | 2006/085308 A1 | 8/2006 |
| WO | WO-2007/062098 | 5/2007 |

* cited by examiner

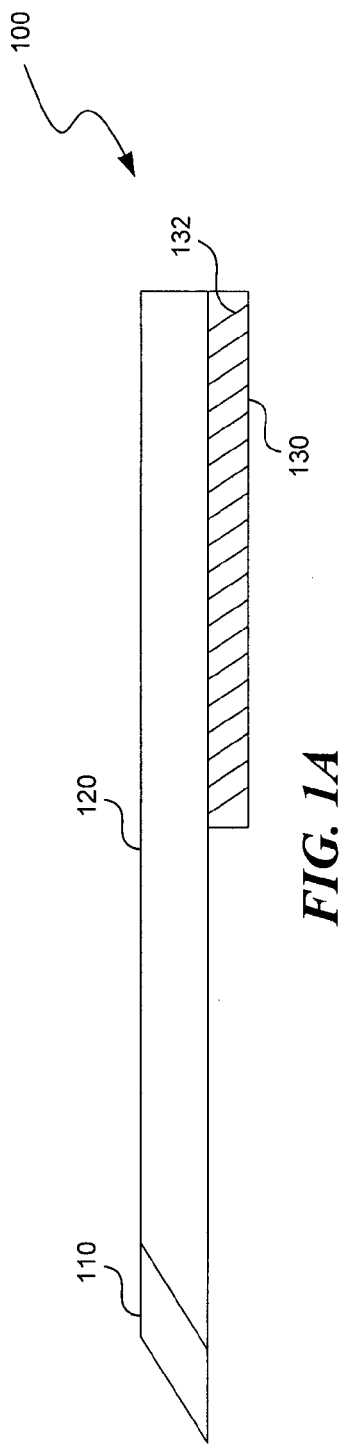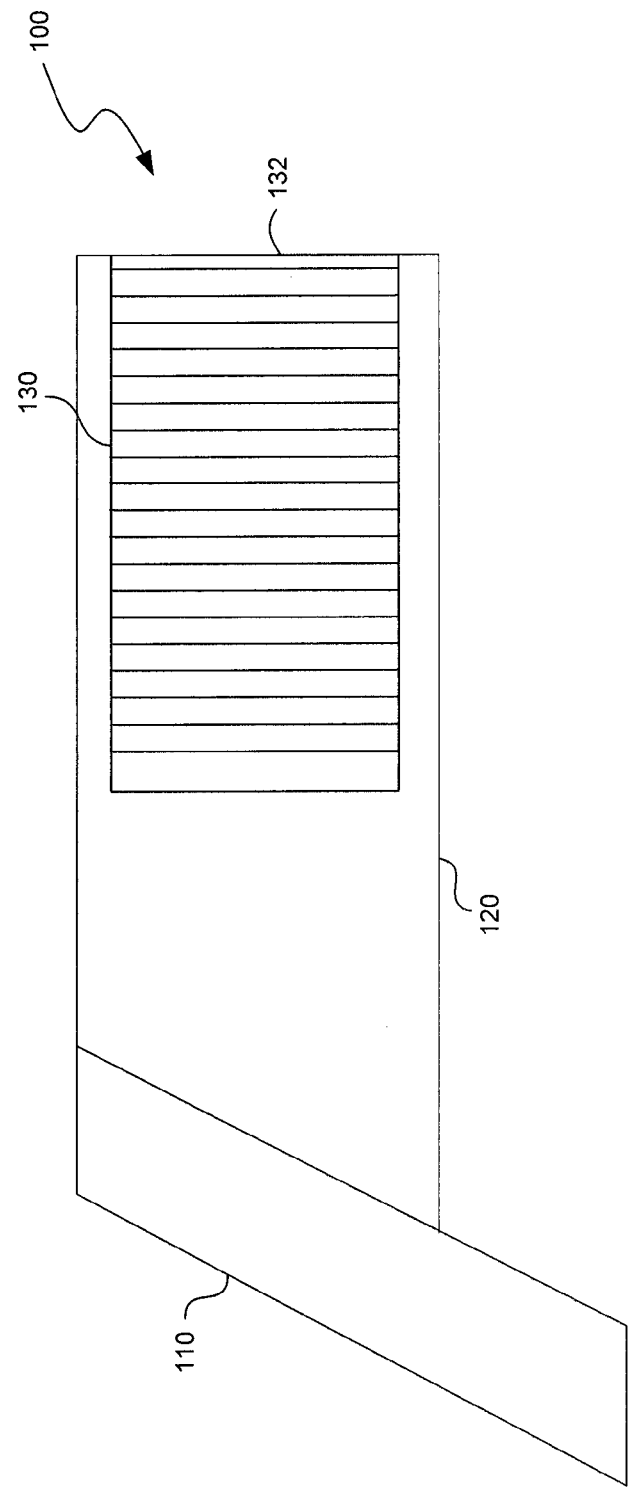

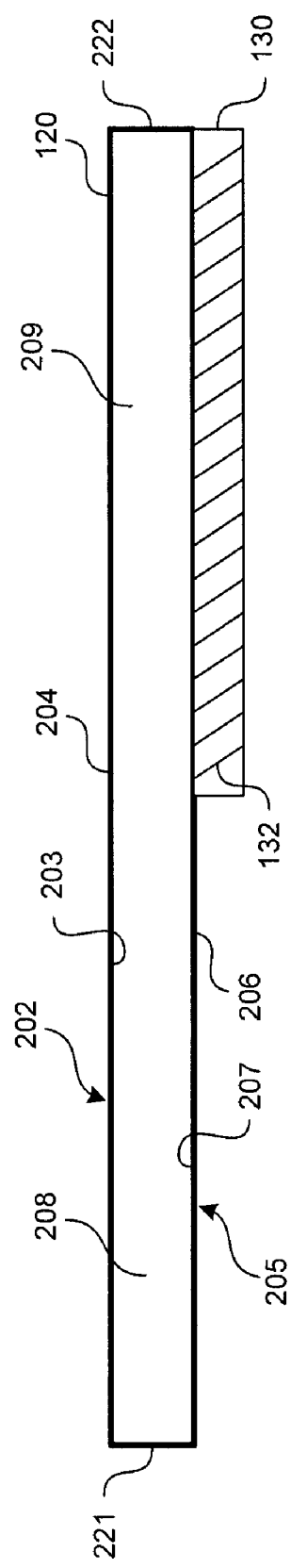
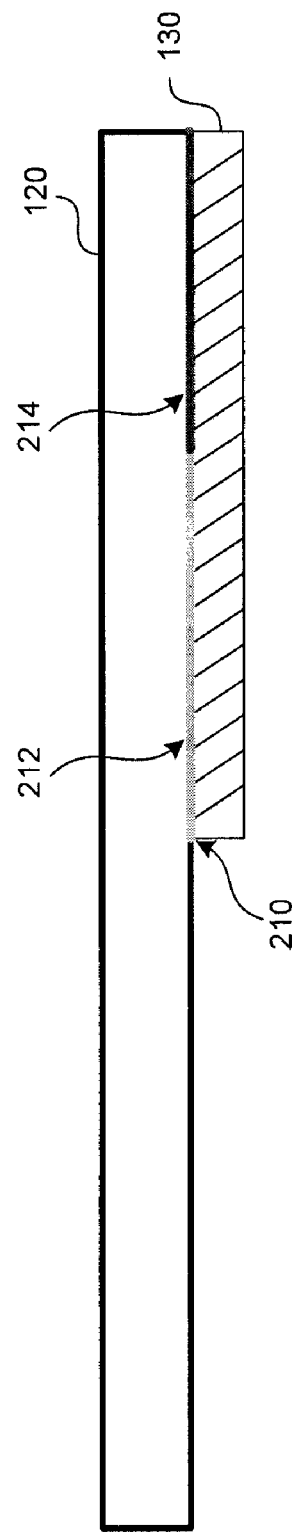

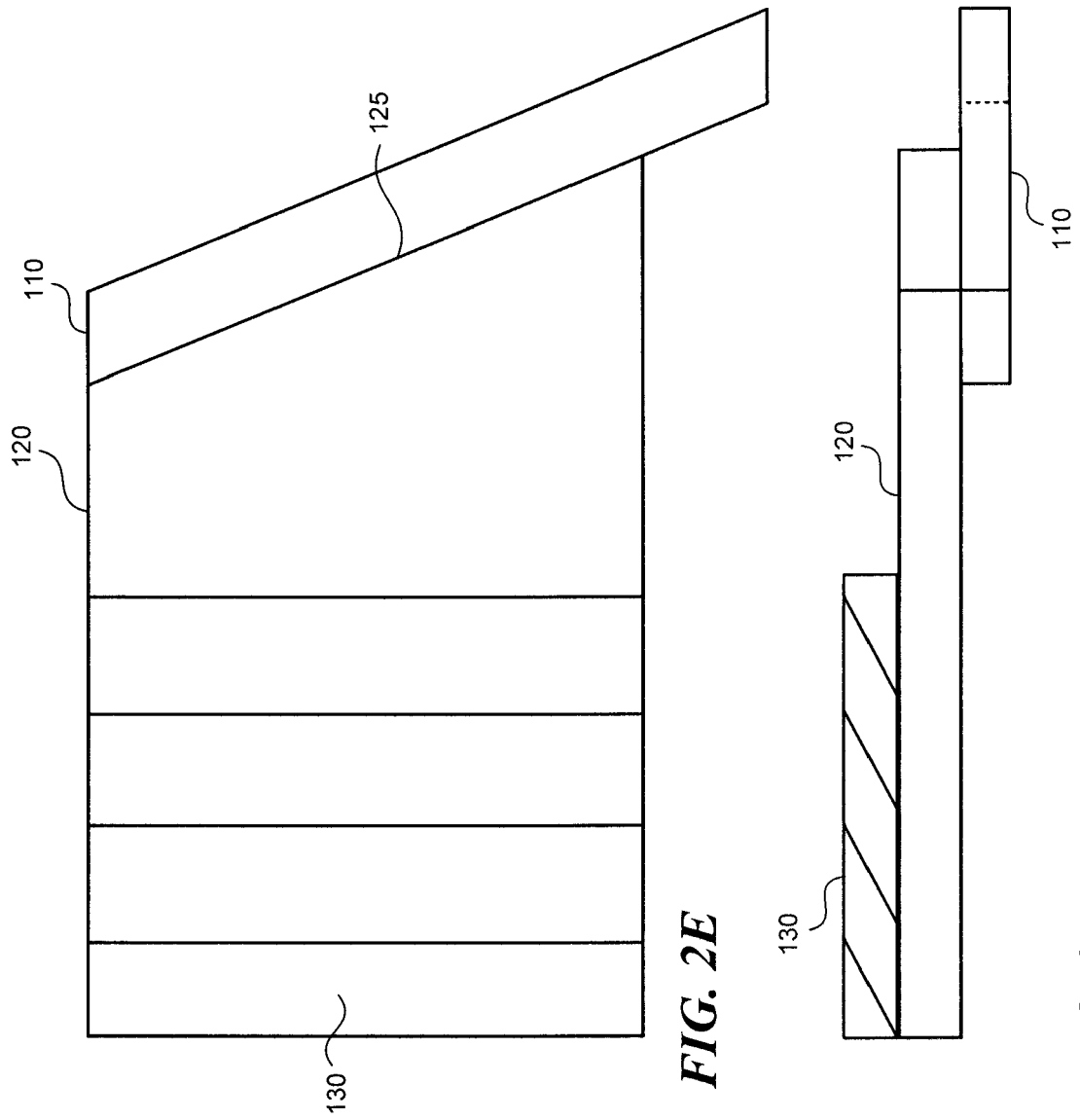

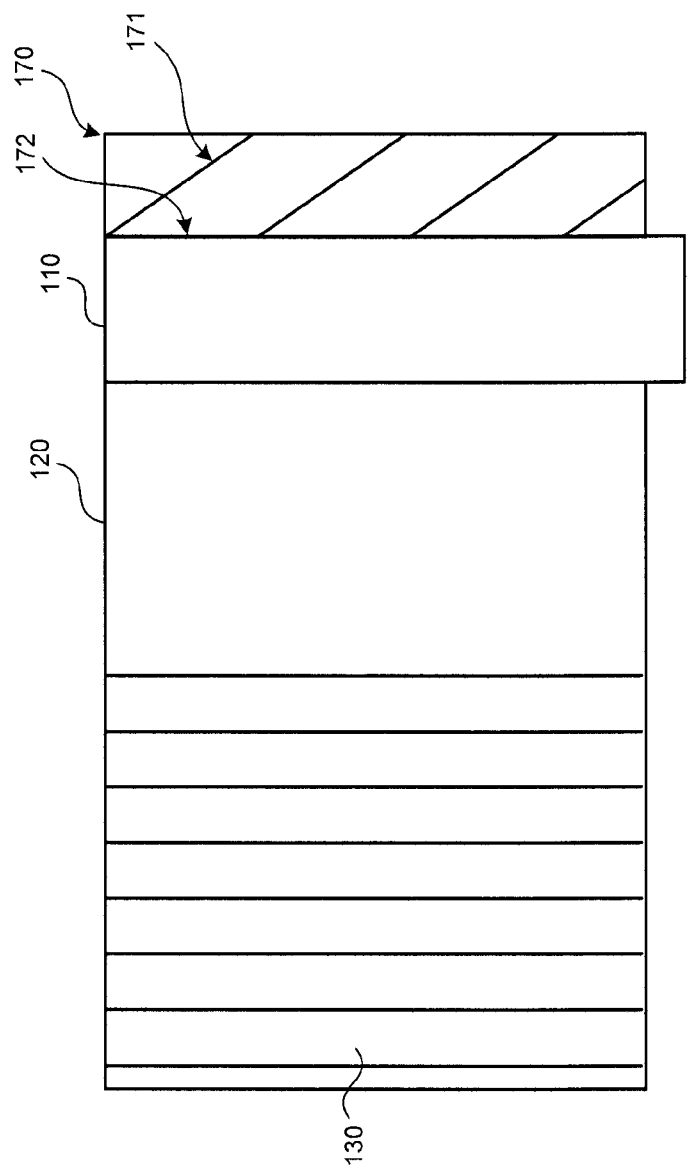
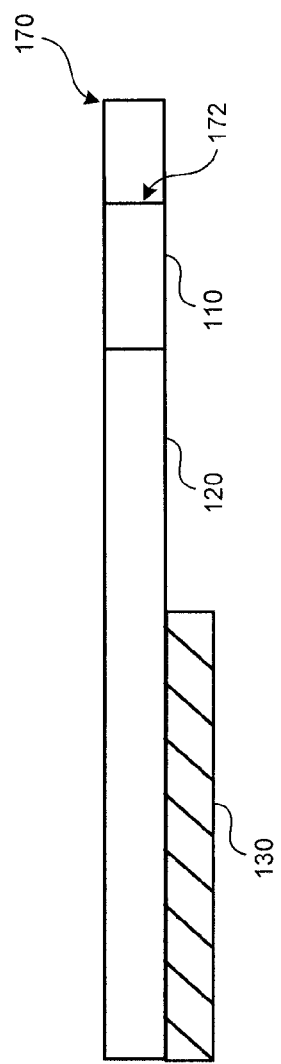
FIG. 2G
FIG. 2H

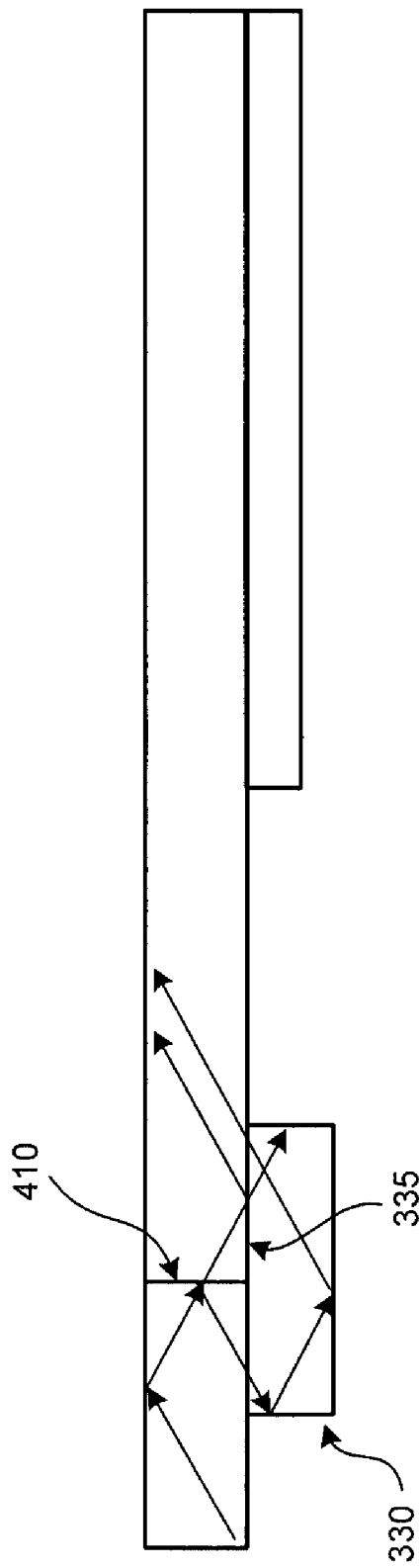
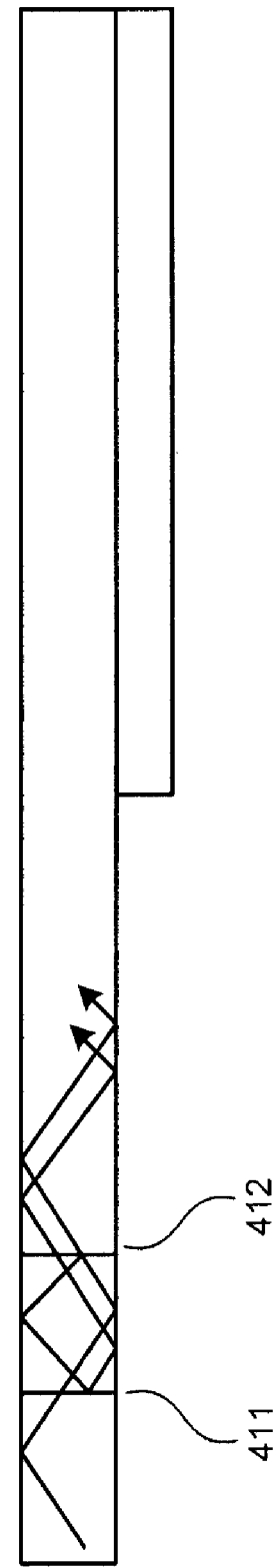
FIG. 4A
FIG. 4B

SUBSTRATE-GUIDED RELAYS FOR USE WITH SCANNED BEAM LIGHT SOURCES

BACKGROUND

Head-mounted and other compact display systems, such as head-up displays (HUDs), laptops, monitors, and other systems often rely on optical devices that overlay images onto transparent optical elements. For example, systems may display images through transparent lenses in front of a user's eyes to enable the user to view displayed images at the same time as viewing objects in the environment. Some of these display systems may utilize substrate-guided relays having three primary components: an input coupler, a transmission substrate, and an output coupler. Light beams or other electromagnetic waves enter the relay via the input coupler and remain confined within the relay due to total internal reflection or applied coatings. The beams are guided to the output coupler within the substrate, and the beams exit the relay via the output coupler.

Various techniques may be used to insert light into substrate-guided relays. Some current systems use diffractive collimation (where LCD panels transmit light to a holographic element that inserts light into a relay) and/or refractive collimation (where lenses insert LCD produced light into the relay). However, these systems require increases in size in order to expand the field of view or exit pupil expansion. Display systems relying on these techniques are therefore large and heavy when a wide field of view is desired.

Various techniques may be used to couple light out of substrate-guided relays. Some current relays employ transmission substrates that have mirrors embedded in the substrate to couple light from the substrate. Although relays relying on this structure may provide a desirable form factor, the relays require numerous reflectors each having a different and precise reflectance characteristic, which create discontinuities in an image within the relay and images seen through the relay. They often do not efficiently couple light out of the substrate.

A short-coming of existing substrate-guided relays is that they are not compatible with recent advances in light source technology. For example, current substrate-guided relays are sub-optimal when used with scanned beam light sources to create images, such as systems that use MEMS based scanning mirrors to scan a beam across two axes to create an image. Scanned beam light sources produce narrower input beams and current relays have poor efficiency and do not generate sufficient duplicates to produce a uniform image or pupil for smaller scanned beam based images. Additional problems arise when expanding the field of view or the pupil with current relays, making the relays difficult to fabricate and manufacture.

These and other problems exist with adapting current substrate-guided relays for scanned beam light sources.

BRIEF DESCRIPTION OF THE DRAWINGS

FIG. 1A is a top cross-sectional view illustrating a substrate-guided relay having an angled input coupler and separate output coupler.

FIG. 1B is a rear view illustrating a substrate-guided relay having an angled input coupler and separate output coupler.

FIG. 2A is a top cross-sectional view of a combination output coupler/intermediate substrate.

FIG. 2B is a top cross-sectional view of a combination output coupler/intermediate substrate having a varying reflectance layer at an interface of the combination.

FIGS. 2E and 2F are side and top cross-sectional views of a combination input coupler and intermediate substrate with the input coupler mounted at a 45 degree angle with respect to the intermediate substrate.

FIGS. 2G and 2H are side and top cross-sectional views of a combination input coupler, intermediate substrate, output coupler and cross coupler.

FIG. 4A is a top cross-sectional view of a combination output coupler/intermediate substrate having a discrete homogenization component and a partially reflective layer.

FIG. 4B is a top cross-sectional view of an intermediate substrate including two homogenization layers.

DETAILED DESCRIPTION

Figure 1C:
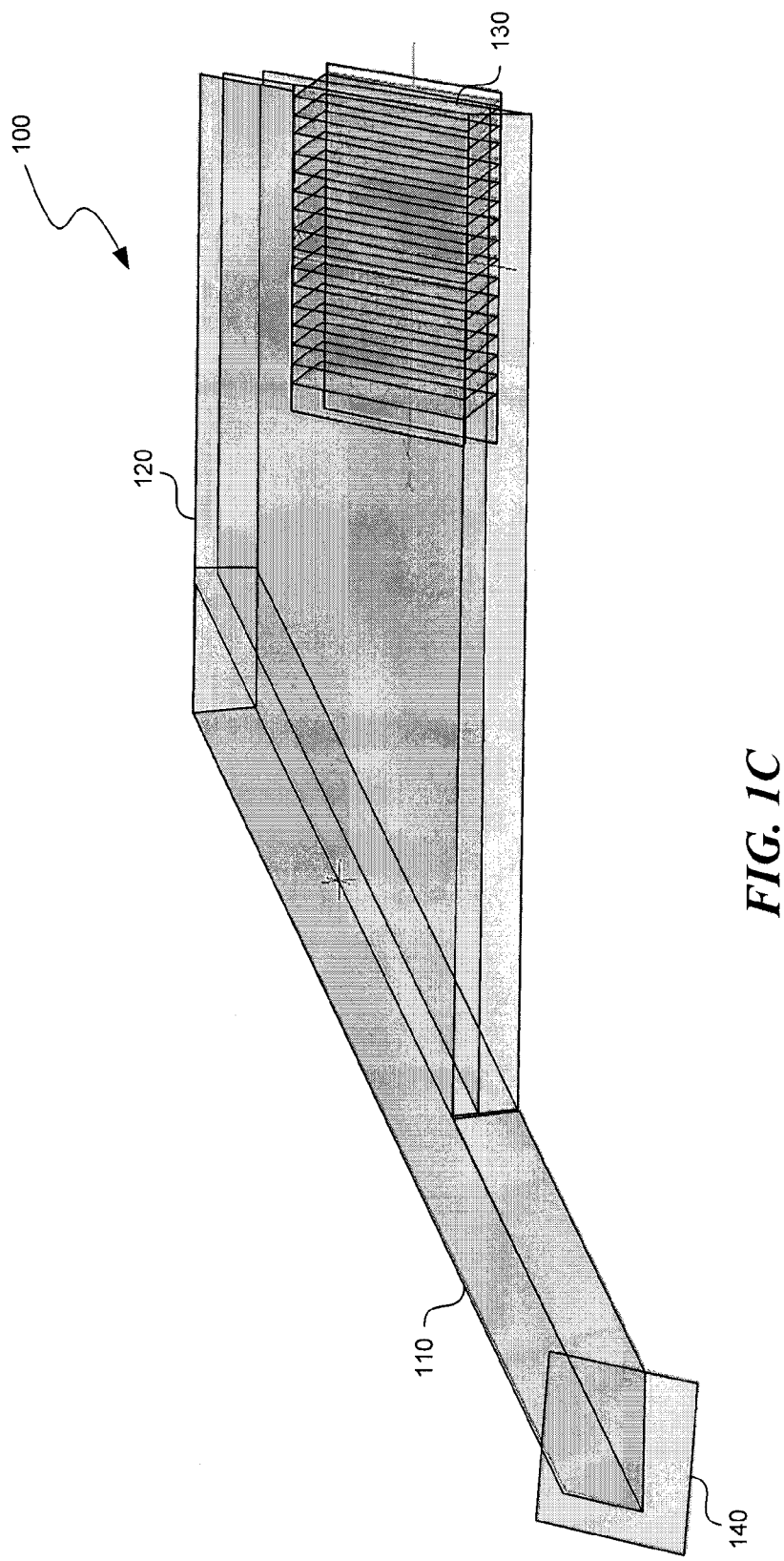
FIG. 1C is an isometric view illustrating a substrate-guided relay having an angled input coupler and separate output coupler.

Various substrate-guided relays that employ light guiding substrates to relay images from sources to viewers in optical display systems are disclosed. The substrate-guided relays are comprised of an input coupler, an intermediate substrate, and an output coupler. In some embodiments, the output coupler is formed in a separate substrate that is coupled to the intermediate substrate. The output coupler may be placed in front of or behind the intermediate substrate, and may employ two or more partially reflective surfaces to couple light to and/or from the coupler. In some embodiments, the input coupler is coupled to the intermediate substrate in a manner that the optical axis of the input coupler intersects the optical axis of the intermediate substrate at a non-perpendicular angle. In some embodiments, the input coupler is coupled to the intermediate substrate in a manner that the optical axis of the input coupler intersects the optical axis of the intermediate substrate at a perpendicular or substantially perpendicular angle. Relays having the disclosed construction may be optimized to provide a large field of view for images formed from scanned beam light sources, such as lasers. Similarly, relays having the disclosed construction may be optimized to provide a large field of view for images formed from other light sources, such as non-scanned beam light sources. The relays may also be optimized based on pupil location of a viewer (e.g., the location of the pupil within a produced field of view), pupil dimensions, pupil uniformity (e.g., providing a uniform image to the entire pupil), and may be modified to achieve desired image brightness, see through uniformity, see through brightness, and simplicity of manufacture.

The relay construction disclosed herein provides a compact form factor that may be incorporated in thin, lightweight devices that produce images over desired fields of view. The relays may be incorporated in head-mounted and other compact displays, such as head-up displays (HUDs). For example, eyeglasses and other head-mounted optical devices may incorporate the relays described herein. These head-mounted devices may be transparent or non-transparent (e.g., colored or tinted), realizing similar benefits described herein. Other devices, such as mobile communication devices and other compact devices may also employ the relays.

Various example relays will now be described. The following description provides specific details for a thorough understanding and enabling description of these examples. One skilled in the art will understand, however, that the technology may be practiced without many of these details. Additionally, some well-known structures or functions may not be shown or described in detail, so as to avoid unnecessarily obscuring the relevant description of the various examples.

The terminology used in the description presented below is intended to be interpreted in its broadest reasonable manner, even though it is being used in conjunction with a detailed description of certain specific examples of the technology. Certain terms may even be emphasized below; however, any terminology intended to be interpreted in any restricted manner will be overtly and specifically defined as such in this Detailed Description section.

Substrate-Guided Relays

FIG. 1A is a top cross-sectional view illustrating a substrate-guided relay 100 having an angled input coupler 110 coupled to an intermediate substrate 120 and separate output coupler 130. The input coupler 110 receives light from a light source (not shown), such as a laser or other scanned beam source, an LCD, LED, DLP, and so on. For example, the light may be in the form of an angularly encoded image from a source of light that produces an image in angle space. The input coupler conveys light to the intermediate substrate 120, which is a slab guide or other optical substrate capable of conveying light from the input coupler to the output coupler. As will be described in additional detail herein, the input coupler 110 may contact the intermediate substrate 120 at an angle, and may homogenize received light before conveying the light to the intermediate substrate. The intermediate substrate 120 conveys light received from the input coupler 110 to the output coupler 130. The intermediate substrate 120 may additionally homogenize any received light, further creating additional rays of the received light The output coupler 130 receives light from the intermediate substrate and enables a viewer (not shown) to view the displayed image. In some cases, the output coupler couples light out via embedded partially reflective components 132, such as partially reflective mirrors. Further details regarding the output coupler 130 are described herein.

FIG. 1B is a rear view of the substrate guided relay 100 of FIG. 1A. The output coupler 130 is coupled to the intermediate substrate 120 at a rear surface of the intermediate substrate 120. The input coupler 110, coupled to the intermediate substrate 120 across the length of the intermediate substrate, may introduce light into the intermediate substrate that subsequently conveys light to the output coupler 130 and out of the relay 100 via partially reflective components 132 within the output coupler.

FIG. 1C is an isometric view illustrating a substrate-guided relay having an angled input coupler and separate output coupler. Light is inserted into the input coupler 110 via an input component 140, such as a MEMS scanning mirror, reflective plate, LCD or other component capable of conveying a collimated beam of light to the input coupler 110. The input coupler conveys the beam of light to the intermediate substrate 120. In the intermediate substrate 120, which may be a slab guide, the light is optionally homogenized before being coupled out of the relay via output coupler 130. In FIG. 1B, the output coupler is located on the face of the intermediate substrate that is closer to the viewer, however, the output coupler may be located on the face of the intermediate substrate that is away from the viewer as shown in other figures. In embodiments where the output coupler is away from the viewer, the relay may contain reflecting components 132 set at different angles or may contain fewer reflecting components 132 than in other configurations described herein.

Figure 1D:
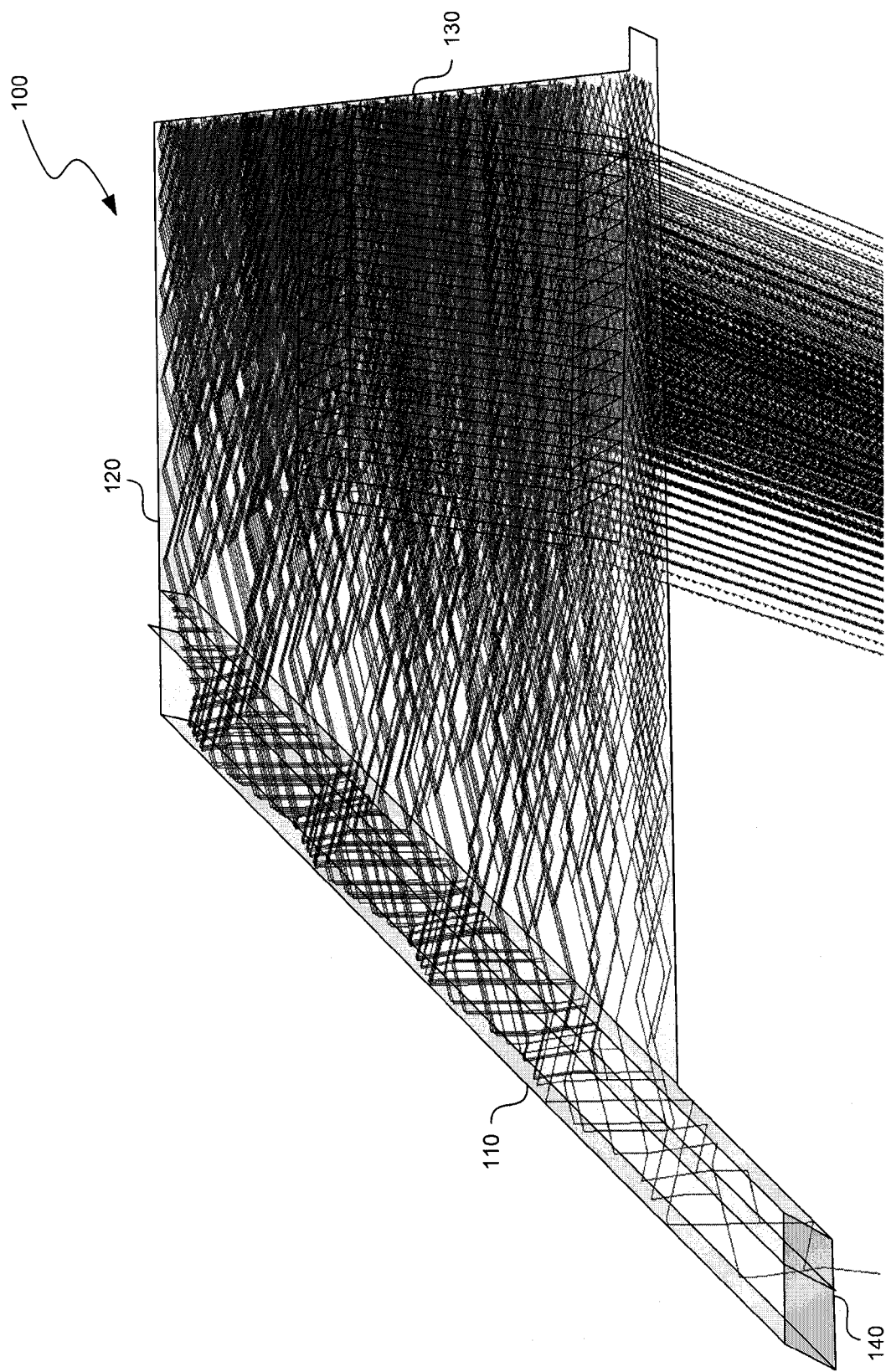
FIG. 1D is an isometric view illustrating the presence of light rays within the relay of FIG. 1C.

FIG. 1D is an isometric view illustrating the presence of light waves within the relay of FIG. 1C and the impact of a homogenizer in the relay. For purposes of illustration, the input component 140 is depicted as inserting a single beam of light 150 into the input coupler 110 of the relay 100. In this example, the input coupler homogenizes the light, creating additional light beams 152 from the single beam of light. For example, more than 100,000 beams may be created from a single beam inserted into the input coupler. The light beams travel to the output coupler 130 via the intermediate substrate 120 and are conveyed out of the output coupler 130 to a viewer. The input coupler 110, the intermediate substrate 120, or both, may homogenize light within the relay 100, creating additional beams from beams inserted into the relay. In some cases, the relay homogenizes the light in order to improve the uniformity of the illumination, to increase the output brightness of an image, to expand an output field of view, to increase exit pupil expansion, and so on.

Figure 1E:
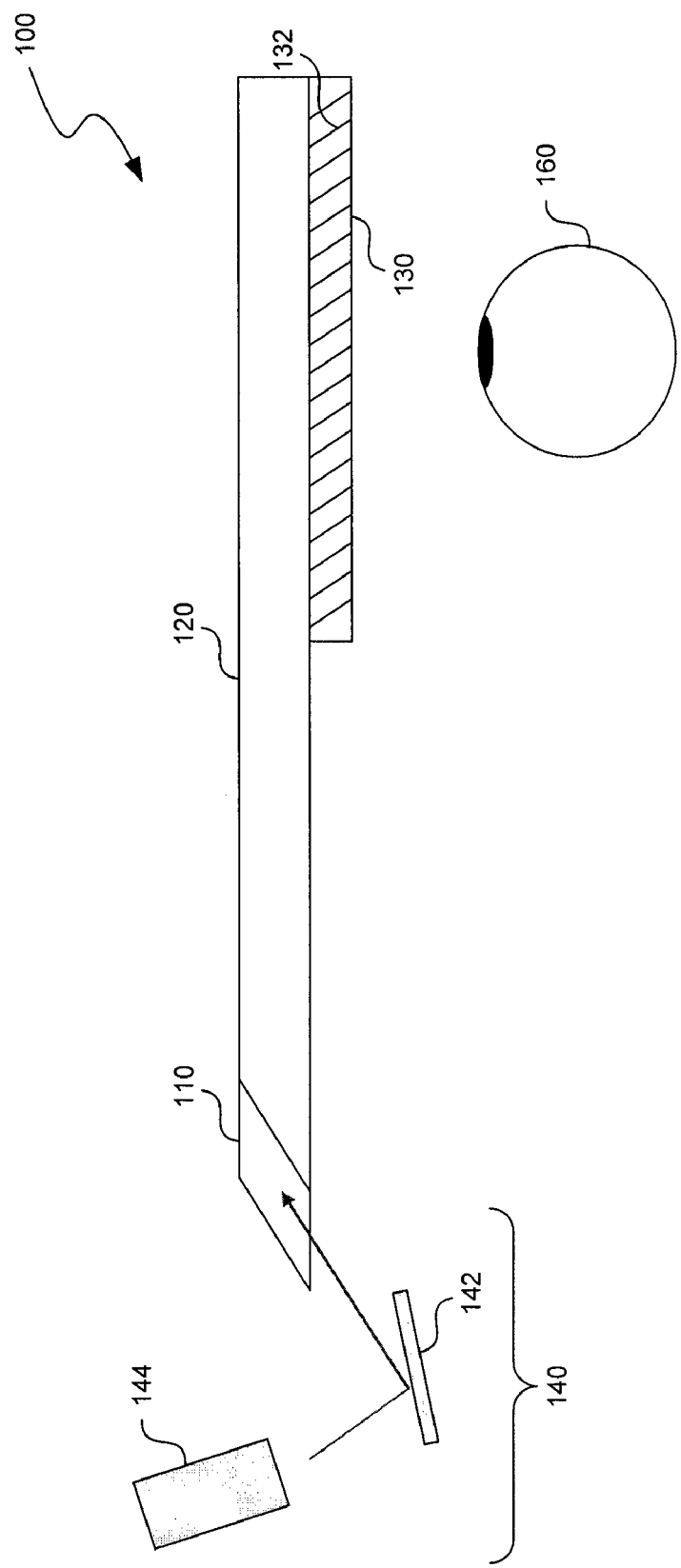
FIG. 1E is a top cross-sectional view illustrating the substrate-guided relay of FIG. 1A adapted for use in eyewear.

FIG. 1E is a top cross-sectional view illustrating the substrate-guided relay of FIG. 1A adapted for use in eyewear. For example, a light beam, such as a beam from one or more lasers 144 is scanned across two axes using a MEMS scanning mirror 142 and inserted into the input coupler 110. The light beam may come from a light source contained within or attached to, for example, a frame of a pair of glasses. The beam (or, subsequently, beams) travels through the input coupler 110, the intermediate substrate 120, and out of output coupler 130 to a viewer's eye 160, positioned proximate to the output coupler 130. For example, the output coupler 130 is integrated with or attached to a lens of the glasses.

For scanned beam light sources, very thin substrates may be used for the input coupler 110, intermediate substrate 120, and/or output coupler 130. For example, the intermediate substrate may have a thickness of less than 4 millimeters, and the output coupler may have a thickness of less than 2 millimeters. The substrates may be formed of optical grade fused silica, glass, plastic, or other suitable materials. Using the substrate configuration described herein therefore allows a compact form factor to be realized for the substrate-guided relay.

In some embodiments, the relay 100 may be manufactured at various thicknesses and with different materials. For example, the thickness and/or material of a relay 100 may be varied to ease the fabrication of the relay, to achieve better image uniformity, to lower the weight or size of the relay, to provide better protection to a user's eye, to provide a higher image quality, to produce the relay at a lower cost, and so on. The thickness and/or material of the relay 100 may depend on angles of insertion, reflection, transmission, or output of light with respect to the relay 100.

Confinement of light within the relay may be due to the total internal reflection (TIR). For example, TIR provides for a high transmission of light (approximately 100%) at see-through angles (approximately 0 to 25 degrees), and high reflection of light at higher angles (approximately 45 to 80 degrees) of incidence. The relay may also incorporate partially reflective coatings outside of or within the relay to achieve a similar confinement of light.

Output Coupler/Intermediate Substrate

FIG. 2A is a top cross-sectional view of a combination intermediate substrate 120 and output coupler 120. The intermediate substrate 120 is configured to contain and convey light to the output coupler 130. The intermediate substrate 120 has, for example, a front face 202, having an inner surface 203 and an outer surface 204, and a back face 205, having an inner surface 207 and an outer surface 206. The intermediate substrate 120 also has an input face 221 and a distal face 222. All or a portion of the surfaces 203, 207 of the intermediate substrate may be configured to confine a beam of light within the intermediate substrate using total internal reflection. All or a portion of the surfaces 203, 207 may be configured to allow a beam of light to leave the intermediate substrate 120. For example, the intermediate substrate may contain a guide section 208 where both inner surfaces 203, 207 of the section reflect all beams of light that impose on the surfaces. The intermediate substrate may also contain a coupling section 209 where the front inner surface 203 reflects any imposed light beams and the back inner surface 207 allows some or all light beams to pass through to the output coupler 130, reflecting any light beams back to the front inner surface 203 that do not travel to the output coupler 130. In some cases, the back inner surface 207 of the coupling section 209 may be graded or may vary with respect to reflectivity and/or transmissivity.

FIG. 2B depicts a top cross-sectional view of a combination output coupler/intermediate substrate having a varying reflectance layer at an interface 210 between the intermediate substrate 120 and the output coupler 130. For example, the back inner surface of the intermediate substrate may have an area of higher reflectivity 212 (such as 60 percent) and an area of lower reflectivity 214 (such as 40 percent). The varied reflectivity surface may have discrete sections, or may continually vary, such as incrementally varying from a high reflectivity at area 212 to a low reflectivity at area 214. Reflectivity may vary as a function of angle of incident light, polarization of incident light, wavelength of incident light, or any combination. If the reflectivity of the surface was not varied, the intensity of the light exiting the output coupler may be less at a point closer to the distal face of the intermediate substrate as compared with a point closer to the input face of the intermediate substrate. Varying the reflectivity/transmissivity provides for a substantially uniform transmission of light beams from the intermediate substrate 120 to the output coupler 130, among other benefits.

In addition, creating a surface of varying reflectance may allow light of one angle to be reflected more than light at another angle, or allow light of one angle to be transmitted more than light at another angle. In some cases, this enables a distal portion of an image to travel to a distal location, and a closer portion of an image to travel to a closer location, creating a clear and more uniform image, among other benefits.

The output coupler 130 is configured to receive light beams from the coupling section 209 of the intermediate substrate 120 and output the received beams to a viewer proximate to the output coupler. For example, the output coupler may include one or more partially reflective surfaces 132 that reflect light beams out of the relay 100. The surfaces 132 are partially reflective in order to provide the light beams to a viewer while at the same time allowing the viewer to see through the coupler 130. In some cases the partially reflective surfaces 132 may be substantially parallel with respect to one another. In some cases the partially reflecting surfaces 132 may have substantially similar partial reflection coatings creating a substantially uniform output coupler transmission so that ambient light passing through the output coupler is substantially uniform. In some cases, the partially reflective surfaces 132 may be spaced in such a way that ambient beams of light may pass through the relay without impinging on any of the surfaces 132 (that is, a viewer looking through the relay may be less distracted by the surfaces 132 as some light beams reflected off objects outside the relay travel through the intermediate substrate and output coupler unimpeded). Additional details about the construction of suitable partially reflective surfaces may be found in application Ser. No. 11/603,964, entitled "Substrate-Guided Display with Improved Image Quality," filed Nov. 21, 2006 and incorporated by this reference in its entirety.

Figure 2C:
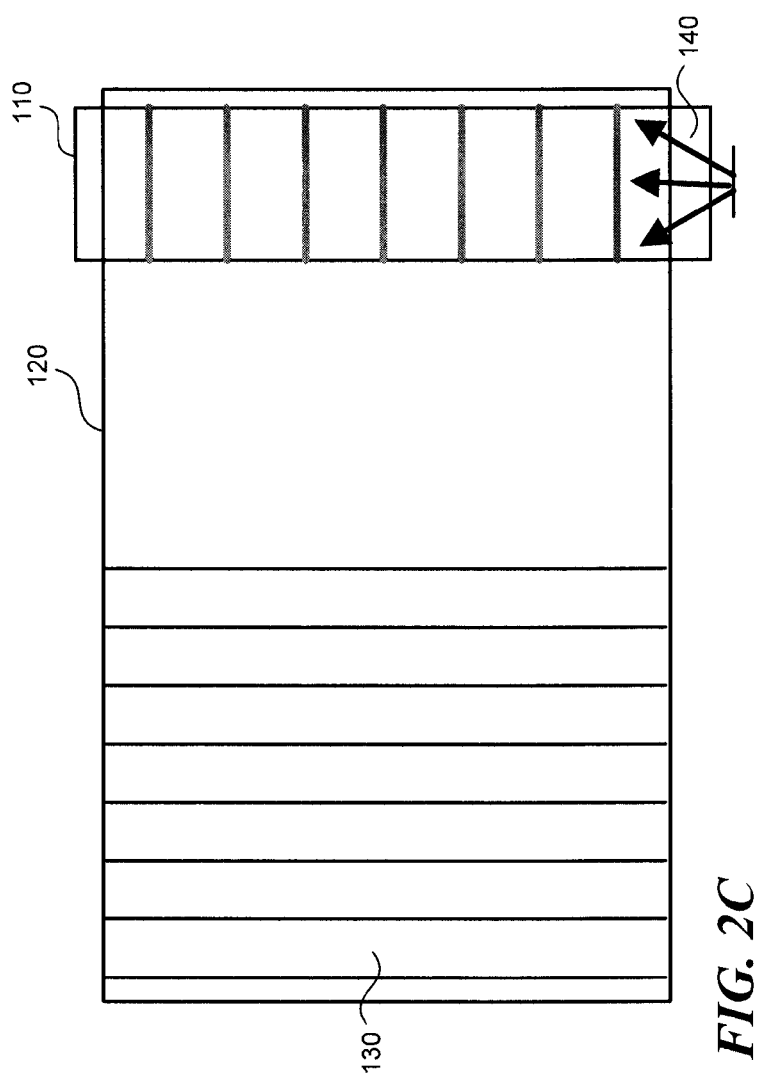
FIGS. 2C and 2D are top and side cross-sectional views of a combination output coupler and intermediate substrate with the output coupler mounted on the opposite surface.
Figure 2D:
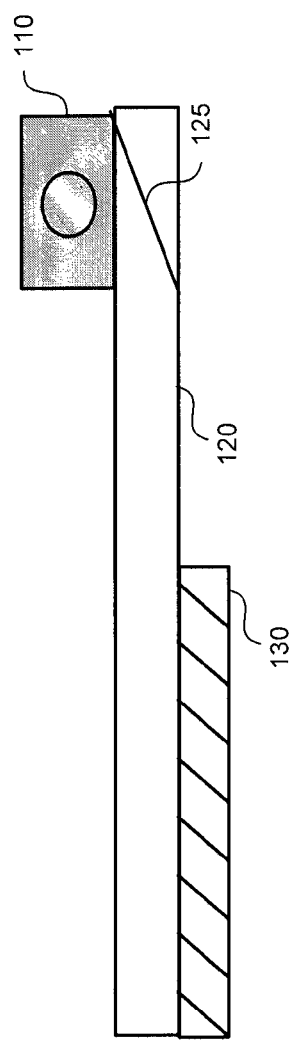

FIGS. 2C and 2D depict top and side cross-sectional views of a combination input coupler 110, intermediate substrate 120, and output coupler 130, where the output coupler 130 is mounted on the opposite surface of the intermediate substrate as the input coupler 110. In this example, the configuration of the input coupler 110 with respect to a reflective or partially reflective surface 125 in the intermediate substrate 120 causes light 140 to be coupled into the intermediate substrate 120 at approximately 45 degree angles with respect to the length of the intermediate substrate 120.

FIGS. 2E and 2F depict side and top cross-sectional views of a combination input coupler 110, intermediate substrate 120, and output coupler 130, where the input coupler 110 is mounted at a 45 degree angle with respect to the intermediate substrate. In some examples the input coupler 110 is mounted on the same surface of the intermediate substrate 120 as the output coupler 130. In some examples the input coupler 110 is mounted on the opposite surface of the intermediate substrate 120 as the output coupler 130. In some examples the input coupler 110 is mounted to an end surface 125 of the intermediate substrate 120.

FIGS. 2G and 2H depict side and top cross-sectional views of a combination input coupler 110, intermediate substrate 120, output coupler 130, and cross coupler 170. The cross coupler 170 may be configured or situated so as to create additional rays of light from light that enters the coupler 170. In some examples, the cross coupler 170 is mounted on a surface opposite the surface between the input coupler 110 and the intermediate substrate 120. In some examples the cross coupler 170 is mounted to other surfaces of the input coupler 170. In some examples the cross coupler 170 may be located between the input coupler 110 and the intermediate substrate 120, or may be located on other surfaces of the intermediate substrate 120.

The surface between the cross coupler 170 and the input coupler 110 includes a partially reflective coating 172. The cross coupler 170 includes full or partial reflectors 171 used to redirect light that passes through coating 172 into the cross coupler 170. In some examples, the reflectors 171 redirect the light into the input coupler 110 at different angles than other light coupled into the input coupler 110. The cross coupler 170 may take on different shapes, such as saw tooth shapes similar to those depicted in FIG. 7A and discussed herein. In some embodiments, the reflective surfaces 171 and the coating 172 may vary discretely or continuously based on angles of incident light, polarization of incident light, wavelength of incident light, or combinations. In addition, surfaces between components of the combination may vary discretely or continuously as a function of angle of incidence, polarization, wavelength, or combinations.

In some embodiments, the reflective surfaces 132 in the output coupler may be coated in order to provide some or all of the benefits described herein. For example, varying the reflectance of the reflective surfaces 132 may enable an image spread uniformly across the output coupler. The varied reflective surfaces 132 may, therefore, assist moving light to intended locations.

Figure 3A:
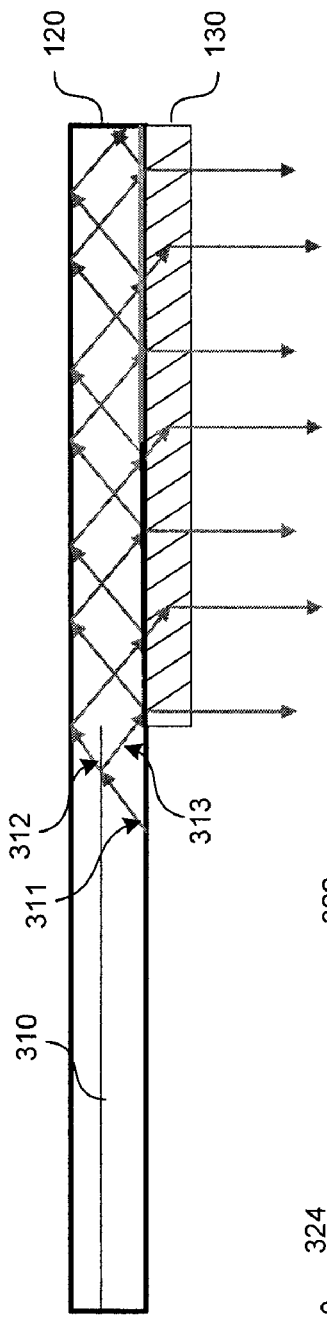
FIG. 3A is a top cross-sectional view of a combination output coupler/intermediate substrate having an internal homogenization layer.
Figure 3B:
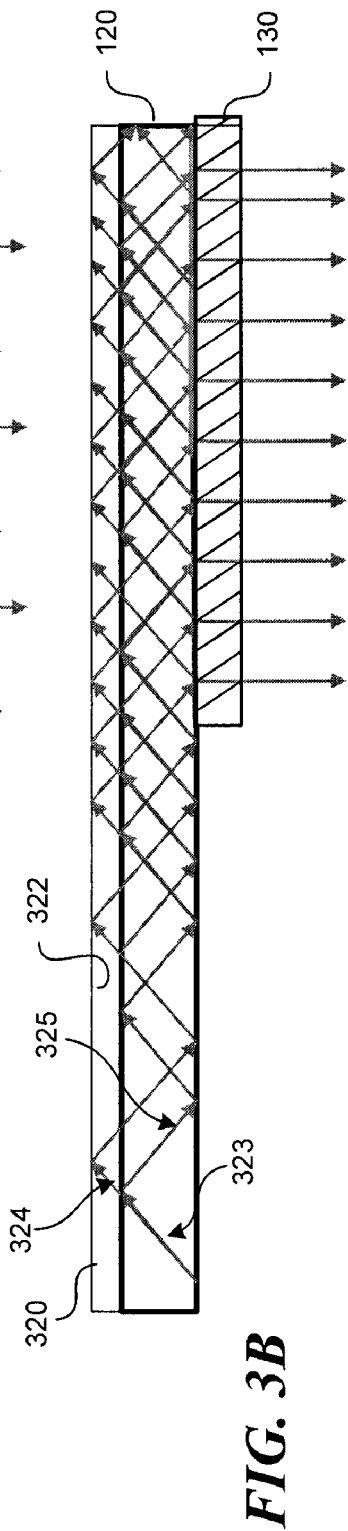
FIG. 3B is a top cross-sectional view of a combination output coupler/intermediate substrate having an external homogenization layer.
Figure 3C:
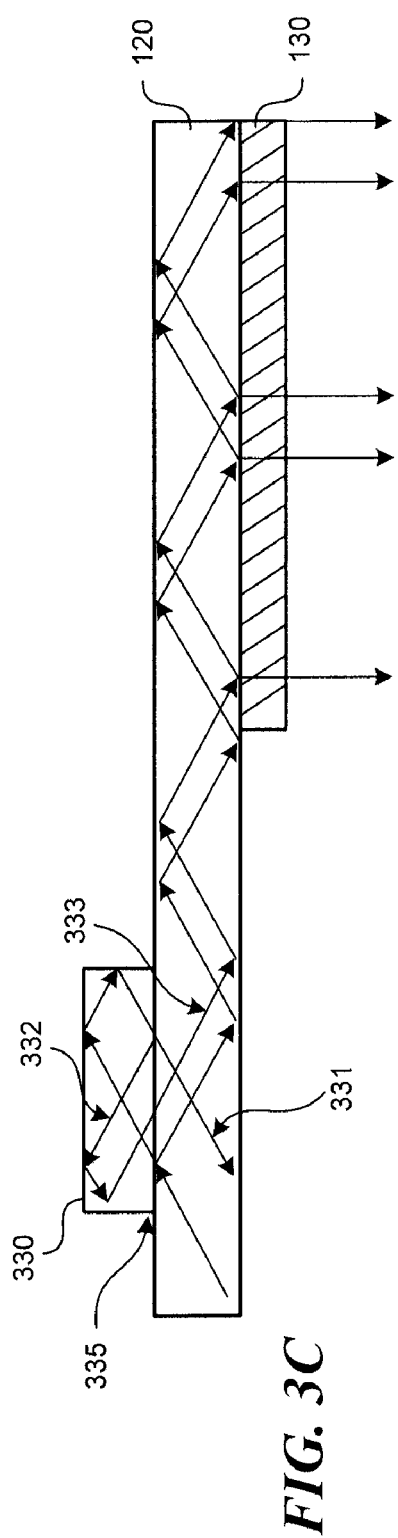
FIG. 3C is a top cross-sectional view of a combination output coupler/intermediate substrate having a discrete homogenization component.

In some embodiments, the intermediate substrate 120 may contain a homogenization structure, such as the various layers and components shown in FIGS. 3A-3C. FIG. 3A depicts a top cross-sectional view of a combination output coupler/intermediate substrate having an internal homogenization layer 310. The layer 310 may be an interface between substrates of differing indices of refraction, may be a beam splitting type interface, or may be a partially reflective layer that reflects part of a beam or beams and transmits part of a beam or beams. The layer 310 causes a single impinging beam 311 to form multiple beams 312, 313. Beam 312 passes through layer 310 unaffected and reflects off the inner surface 203 of the intermediate substrate 120. Beam 313 reflects off layer 310 and creates a second beam having a different path through the intermediate substrate. Thus, the layer enables the system to duplicate or multiply a single beam into multiple beams. The multiple beams may then exit the relay through the output coupler at different locations, providing a homogenized pupil and field of view to a viewer.

In some embodiments, the homogenization layer may be placed adjacent to the front face 202 of the intermediate substrate 120. FIG. 3B is a top cross-sectional view of a combination output coupler/intermediate substrate having an external homogenization layer 320. In order to place the homogenization layer on the front face 202 of the intermediate substrate 120, the front inner surface 203 of the intermediate substrate may be modified to partially reflect incident light beams and partially transmit incident light beams. A front inner surface 322 of the homogenization layer may be configured to total internally reflect any incident light beams, effectively acting to contain all light within the intermediate substrate. In such a construction, a single light beam 323 that impinges on the front inner surface 203 of the intermediate substrate is partially reflected back into the intermediate substrate to form one beam 325 and partially transmitted into the homogenization layer 320 to form a second beam 324. Additionally, every subsequent beam within the intermediate substrate that impinges on the interface between the intermediate substrate 120 and the homogenization layer 320 forms two beams. Thus, the homogenization layer enables the system to form many additional beams from a single inserted beam.

In some embodiments, the homogenization component may be a discrete component mounted to the front face 202 of the intermediate substrate 120. FIG. 3C is a top cross-sectional view of a combination output coupler/intermediate substrate having a discrete homogenization component 330. A single beam 331 that impinges on the front inner surface 203 of the intermediate substrate is partially reflected back into the intermediate substrate to form one beam 333 and partially transmitted into the discrete homogenization component 330 to form a second beam 332. The second beam may propagate at a position offset to the first beam. Additionally, the homogenization component 330 may form many additional beams, all offset from one another. As with the external homogenization layer 320 described in FIG. 3B, light may enter the homogenization component 330 via a partially reflective interface 335 between the component 330 and the front face 202 of the intermediate substrate 120. Thus, the component 330 enables the system to homogenize a single beam into multiple beams. As described herein, the multiple beams may then exit the relay through the output coupler, providing a saturated field of view to a viewer.

In some embodiments, the homogenization may occur due to reflectors placed perpendicular with respect to substrate surfaces. FIG. 4A depicts a top cross-sectional view of a combination output coupler/intermediate substrate having a discrete homogenization component 330 and a partially reflective component or layer 410 placed perpendicular to surfaces of the intermediate substrate. Light may enter the discrete homogenizer 330 via a partially reflective surface 335, or may pass through the layer 410 before entering the homogenization component 330, creating many additional beams of the entering light that are offset from one another.

In addition, the combination output coupler/intermediate substrate may include more than one component or layers 410 to achieve a variety of different offset homogenization patterns of light. FIG. 4B depicts an intermediate substrate including two homogenization layers 410 used to create many additional beams from input light. For example, some light may enter the substrate and pass through the first partially reflective layer 411 and the second partially reflective layer 412, and some light may pass through the first reflective layer 411, be reflected by the second layer 412, be reflected back by the first reflective layer 411 at an angle offset from the original entered light, and then pass through the second reflective layer 412 and into the intermediate substrate. Thus, beams offset from one another may be realized by a combination of reflective layers 410.

In addition to the homogenization layers and components described herein, other configurations able to homogenize a beam of light are of course possible. For example, the system may employ two or more homogenization layers, such as stacked layers having differing indices of refraction or having partially reflective coatings between the layers. In some cases, the layers or components may be substantially parallel to one another and to the intermediate substrate. The layers or components may be of substantially same thickness or may vary in thickness. In some cases, the layers or components may be of different shapes than those illustrated in the figures.

Input Coupler

Figure 5A:
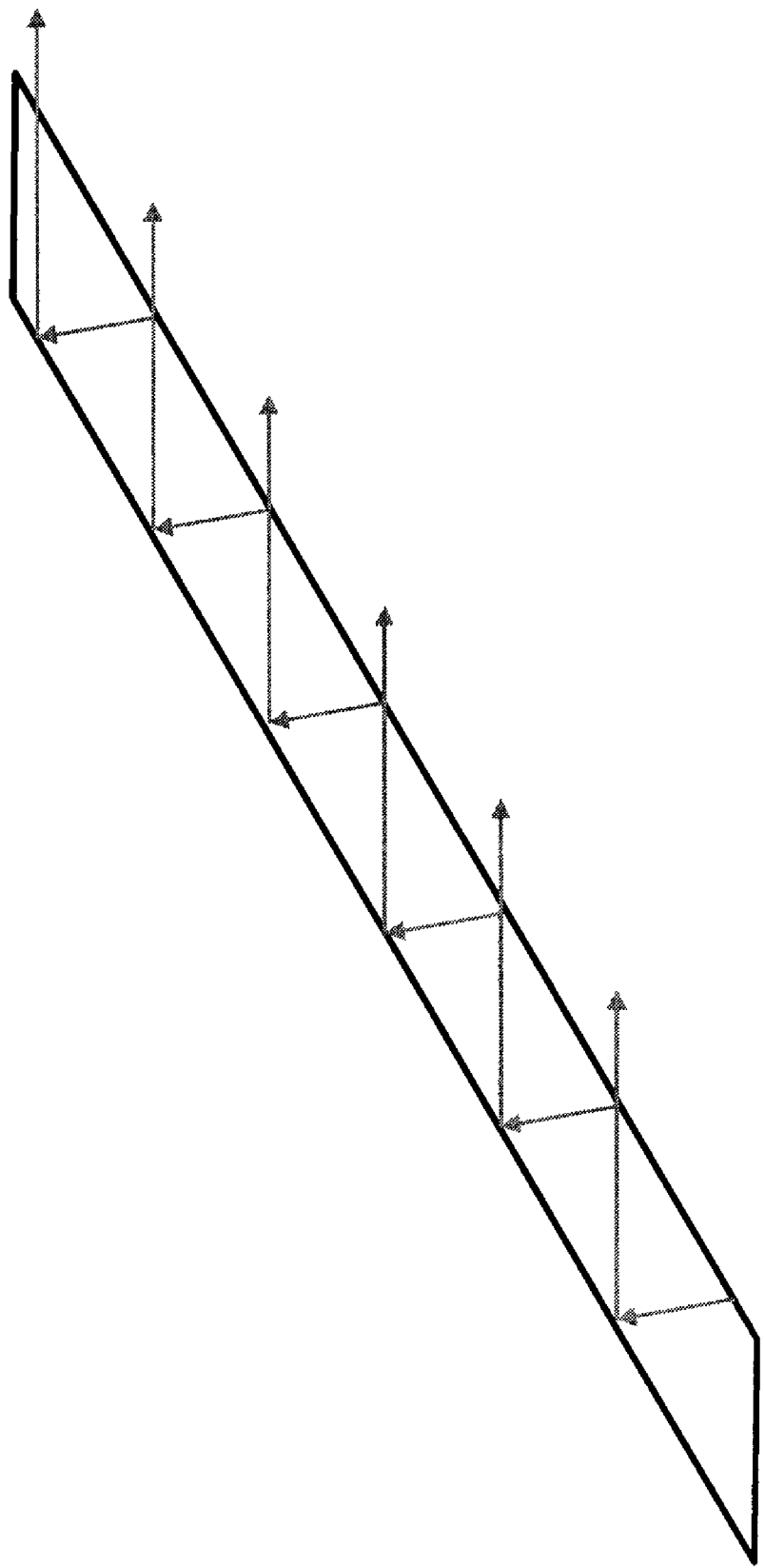
FIG. 5A is a top cross-sectional view of an input coupler having an angled interface surface.

FIG. 5A depicts a top cross-sectional view of the input coupler 110 having an angled interface surface. The input coupler may be formed of optical grade fused silica or other isotropic materials. The input coupler is coupled to an intermediate substrate in a configuration where the angle of interface between the input coupler and intermediate substrate is not perpendicular. However, in some cases, the angle of interface may be perpendicular, depending on the needs of a user.

Figure 5B:
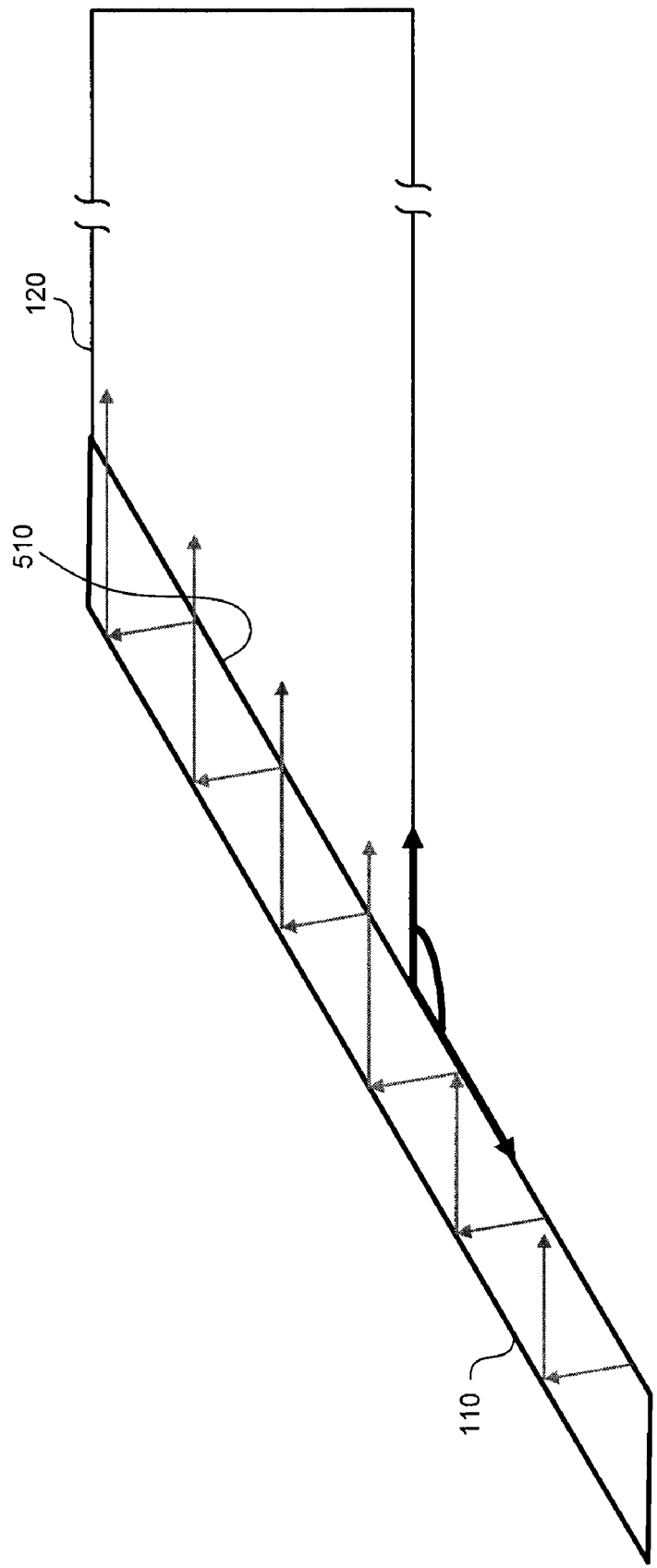
FIG. 5B is a top cross-sectional view of an input coupler proximate to an intermediate substrate.

FIG. 5B depicts a top cross-sectional view of the input coupler 110 proximate to the intermediate substrate 120. The angle Θ of interface between the input coupler 110 and the intermediate substrate may be any angle, such as 135 degrees. A surface 510 of the input coupler may be partially reflective, allowing some light beams to enter the intermediate substrate and reflecting some light beams back into the input coupler 110. The reflective surface 510 may vary across the interface, being more reflective at the end closest to where light enters the input coupler and less reflective at the other end.

Figure 6A:
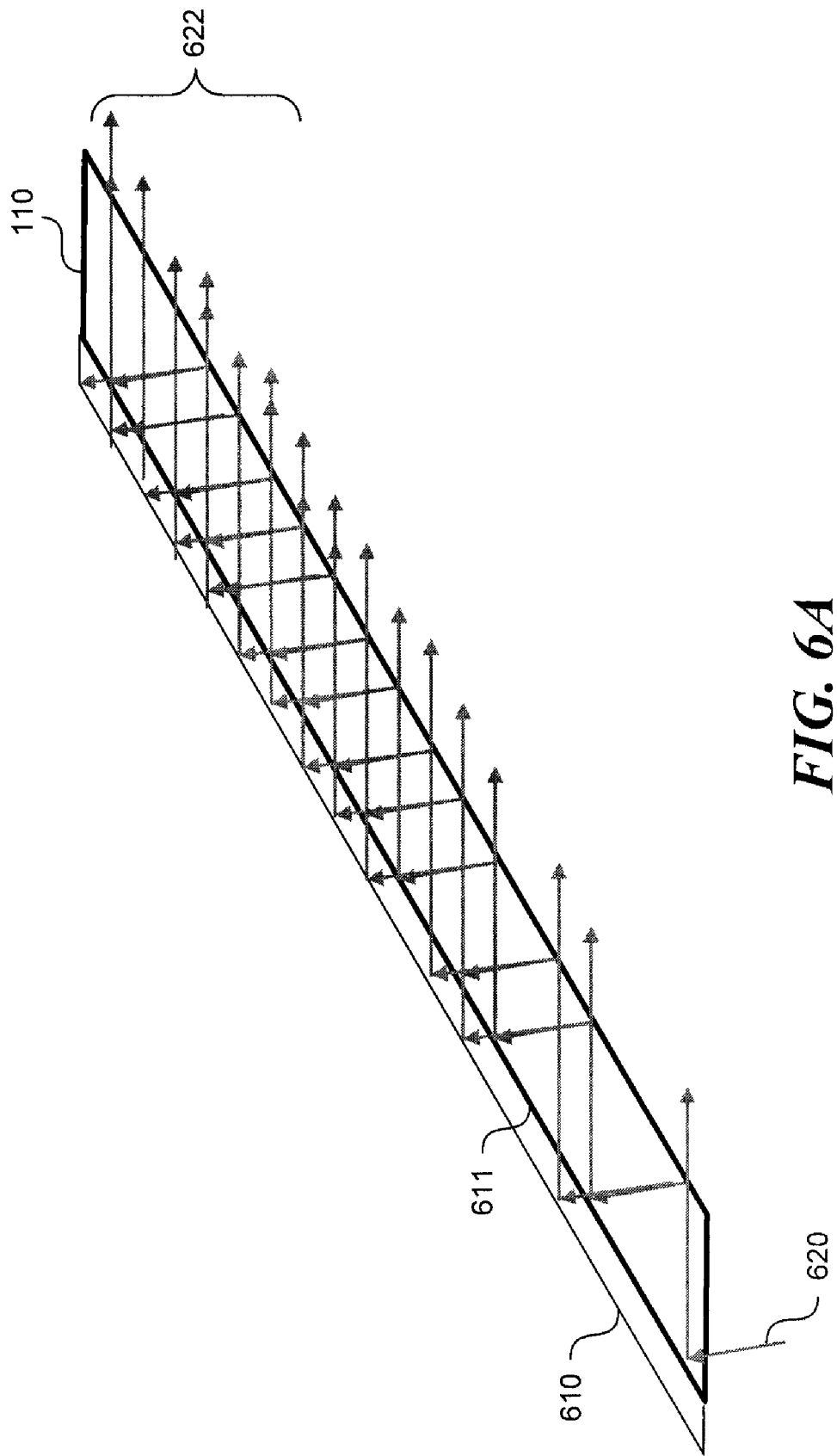
FIG. 6A is a top cross-sectional view of an input coupler having an angled interface surface and an external homogenization layer.
Figure 6B:
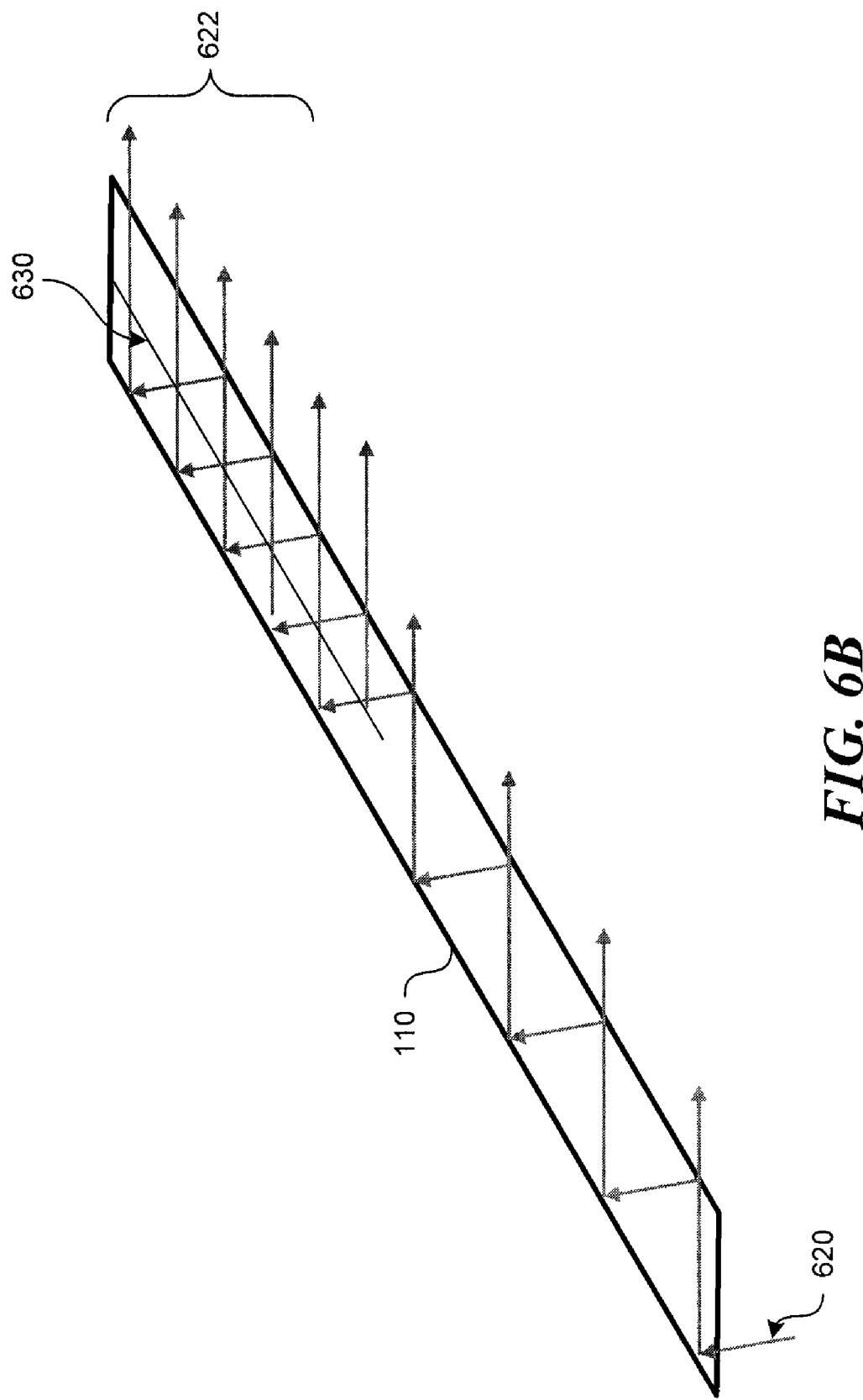
FIG. 6B is a top cross-sectional view of an input coupler having an angled interface surface and an internal homogenization layer.
Figure 7B:
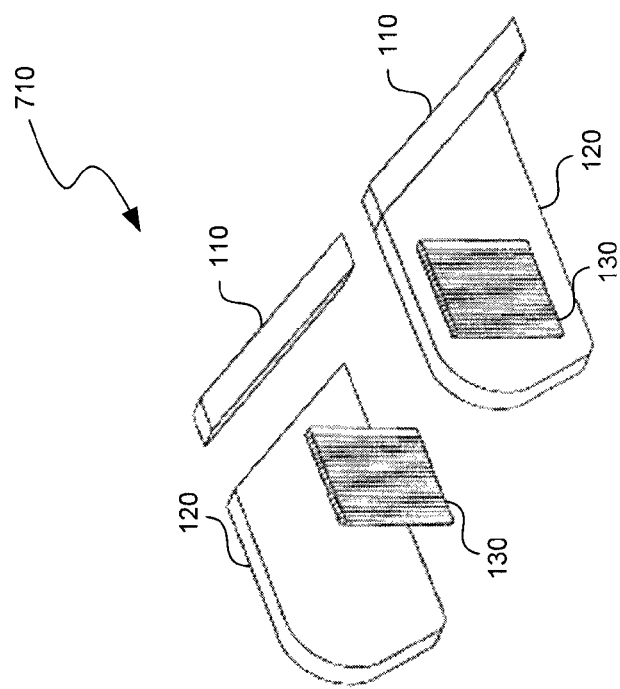
FIG. 7B is an exploded view of the relay in some embodiments.
Figure 7A:
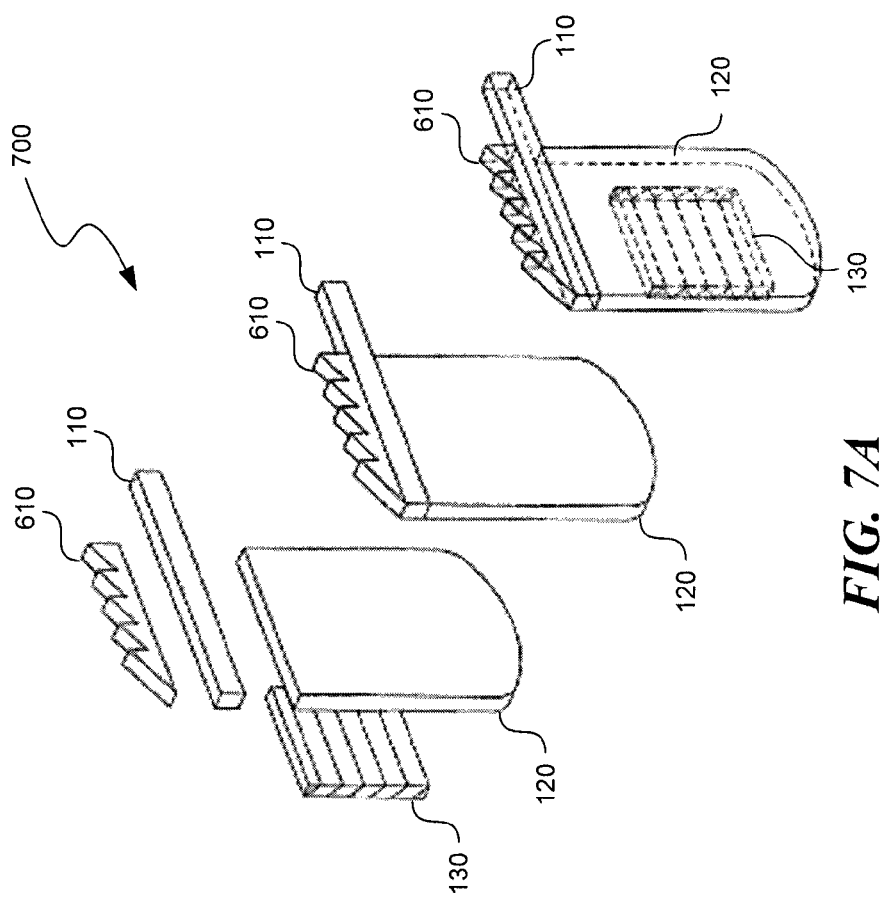
FIG. 7A is an exploded view of the relay in some embodiments.

In an analogous manner to the operation of the intermediate substrate 120, the input coupler 110 may homogenize a single beam (or, multiple beams) into additional beams using a homogenization layer or other component. FIG. 6A is a top cross-sectional view of an input coupler 110 having an angled interface surface and an external homogenization layer 610. The external layer 610 causes multiple beams 622 to form from a single beam 620 at an interface 611 between the input coupler 110 and the homogenization layer 610. FIG. 6B is a top cross-sectional view of an input coupler 110 having an angled interface surface and an internal homogenization layer 630. The internal layer 630 causes multiple beams 622 to form from a single beam 620. The layer 630 may be a partially reflective layer, partially allowing a beam to pass through to the intermediate substrate and partially reflecting the beam to form a second beam in the input coupler. As described herein with respect to the various disclosed examples, the relay may be formed in a variety of configurations. FIGS. 7A and 7B reflect a few of these configurations. For example, FIG. 7A depicts an exploded view of a relay 700, including an input coupler 110, an intermediate substrate 120, an output coupler 130, and a homogenization component or layer 610. FIG. 7B depicts a relay 710 having an alternative configuration, although it also includes an input coupler 110, an intermediate substrate 120, and an output coupler 130. Of course, other configurations of relays, input couplers, intermediate substrates, and/or output couplers are possible.

Coupling Light into a Substrate

Figure 8:
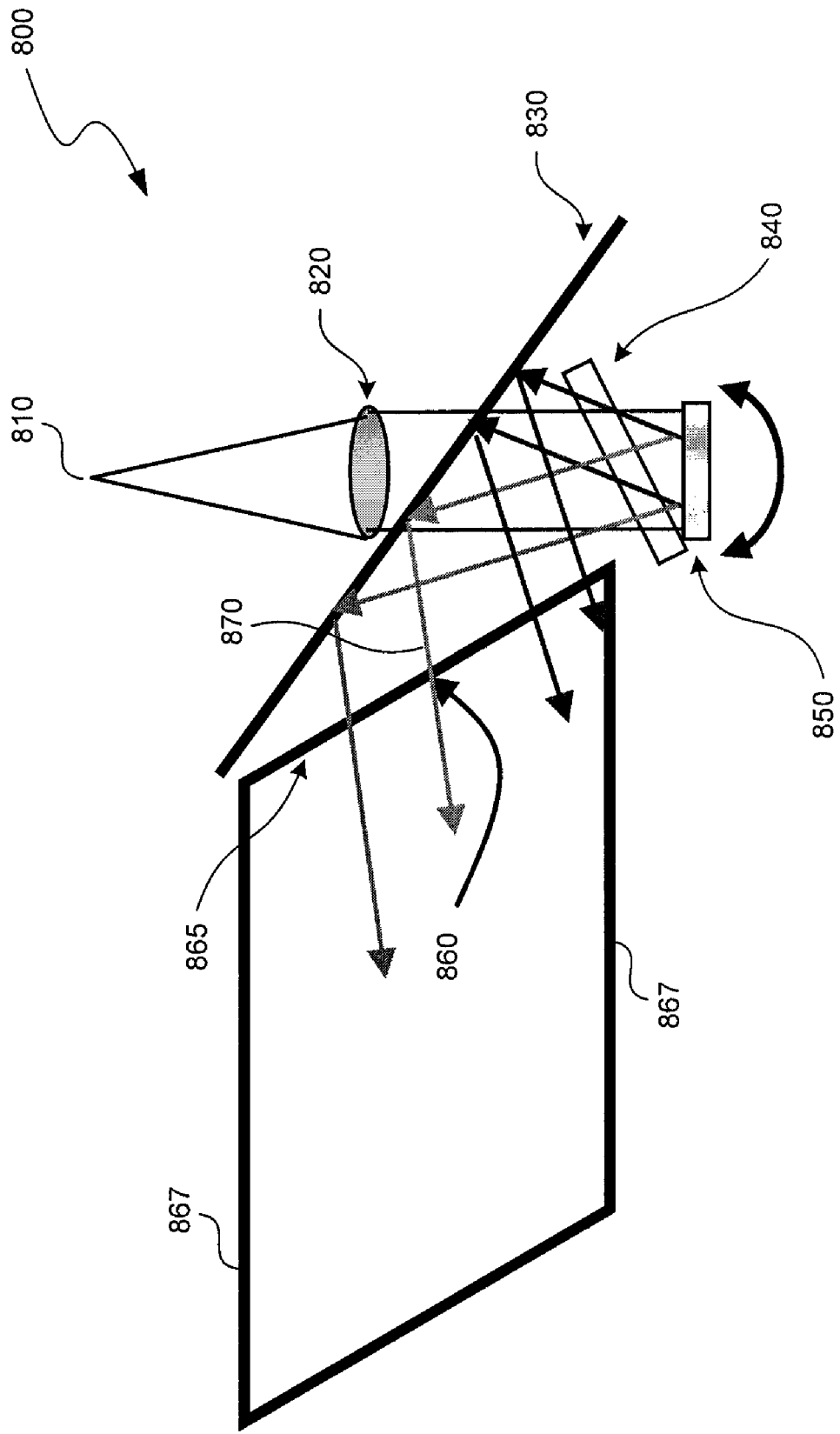
FIG. 8 is a top cross-sectional view of components for coupling light into a substrate-guided relay.

FIG. 8 depicts a cross-sectional view of components 800 used to couple light into a substrate-guided relay. Polarized light is emitted by a source 810, such as one or more scanned beams sources. A lens 820 collimates the polarized light, and the collimated light passes through a polarizing beamsplitter 830, through a quarter-wave plate 840, and reflects off of a scanning MEMS mirror 850. Once reflected by the mirror 850, the light passes through the quarter wave plate 840 and is now reflected off the polarizing beamsplitter 830 due to the rotation in polarization of the light. The reflected light enters an input coupler 860 (such as input coupler 110) via an input surface 865. In this example, the polarizing beamsplitter 830 is set at an angle relative to the input surface 865 of the input coupler 860 so that beams reflected off the polarizing beamsplitter 830 impinge multiple internal surfaces of the input coupler 860. The angle between the beamsplitter 830 and the input surface 865 may be set so that a central beam 870 of the light passes through the input surface 865 at near-normal incidence.

The depicted configuration of components 800 enables light to be coupled into compact relays. In some examples, distances between components are chosen to minimize the spreading of light from the light source, to select angles of inserting light into the coupler, and so on. In addition, different components may be implemented to achieve similar coupling of light. For example, a reflector (such as a PBS) may be embedded within the input coupler 860, such as on the inside surface of the input surface 865. Light may be scanned by a MEMS scanner and coupled into the input coupler 860 through one of the other surfaces 867, such as by placing a prism on the surface to enable light to enter the coupler. The directly-coupled light is reflected off of the embedded reflector and through the input coupler. In some examples, the input surface 865 may be expanded to allow for wider angle coupling. For example, surface 865 may be larger than a cross-sectional surface of the input coupler 860 at other locations. The size and shape of the expansion of the surface 865 may be dependent on the configuration of components 800, or may be dependent on distances between the components.

Figure 9:
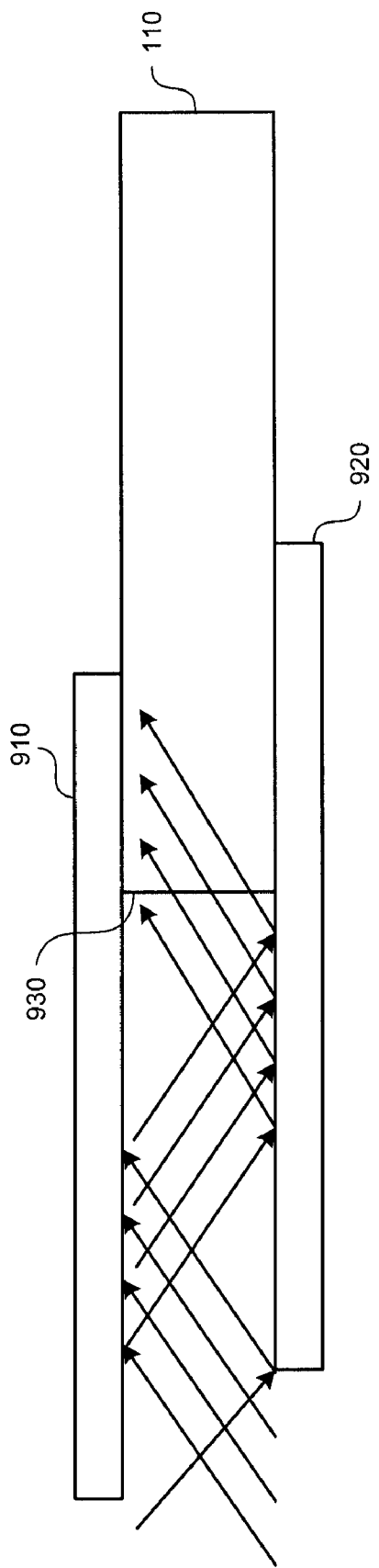
FIG. 9 depicts a cross-sectional view of reflectors used to couple light into a substrate-guided relay.

FIG. 9 depicts a cross-sectional view of reflectors 910, 920 used to couple light into a substrate-guided relay. In this embodiment, reflectors 910, 920 (such as partial reflectors, full reflectors, or reflectors having certain polarization or wavelength reflecting characteristics) are placed on outer surfaces of an input coupler 110 (or, any substrate), to confine light within an area containing an air-substrate boundary 930. There may be a reflector 910, 920 placed on one surface, on two surfaces, or on all surfaces of the input coupler 110. The reflectors (and the area between them) receives light rays from a scanned beam source and guides the light rays into the input coupler 110, preventing the spread of light between the source and the input coupler. Light may enter at an opening, or may enter through one of the reflectors 910, 920, depending on the design needs of an associated substrate guided-relay. For example, in some cases it may be beneficial for light to enter through one of the reflectors in order to achieve a desirable input angle of light into the input coupler 110.

Use of Substrate-Guided Relay in Eyewear

Figure 10:
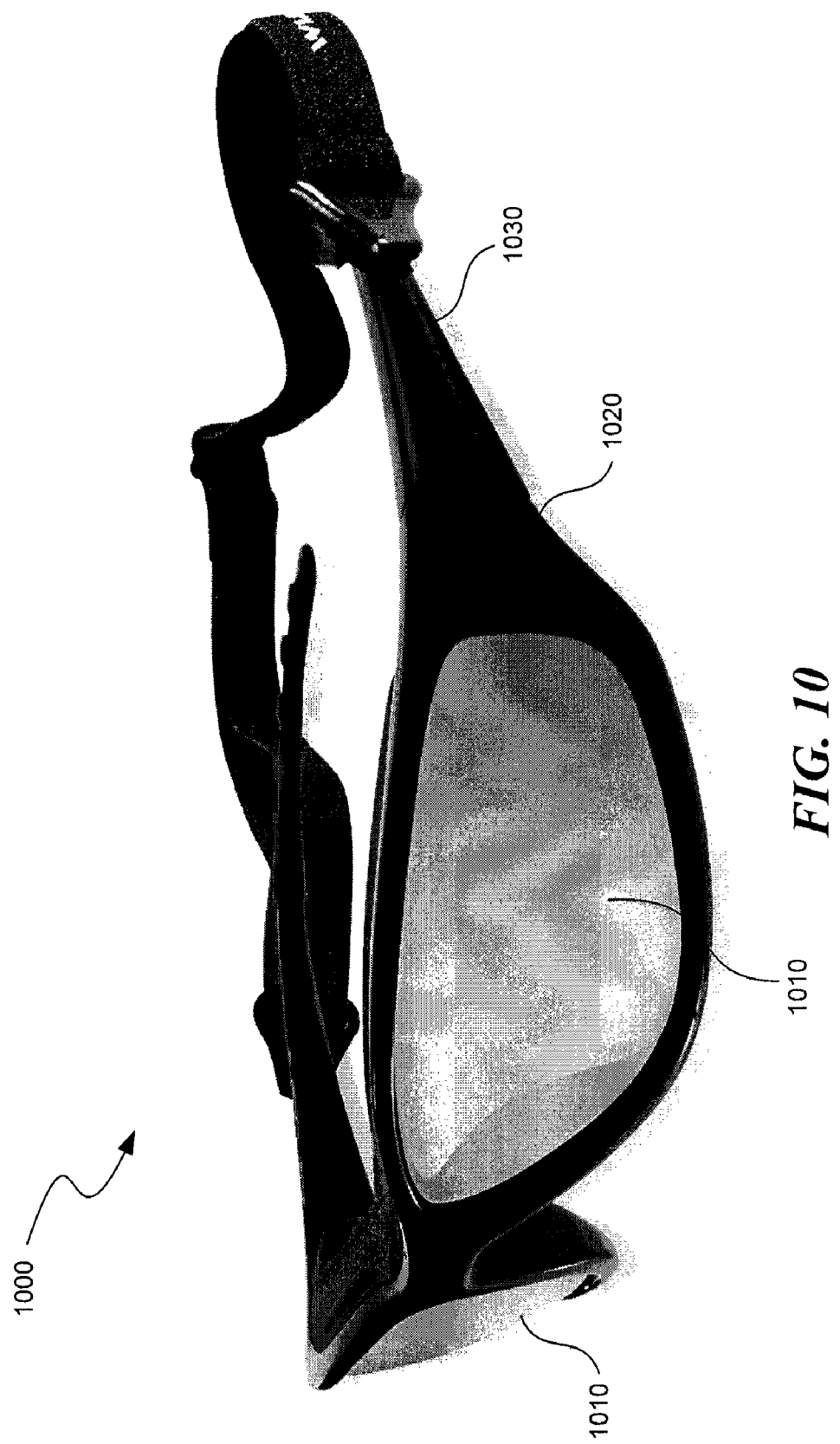
FIG. 10 depicts an isometric view of eyewear incorporating a substrate-guided relay.

In some embodiments, the substrate-guided relay may be used with eyewear, such as eyewear with lenses that are clear, colored or tinted for certain optical effects or for desired fashionable effects. FIG. 10 depicts an isometric view of eyewear 1000. Eyewear 1000 includes lenses 1010 and a frame 1020. Frame 1020 may include some or all parts of a projection system that incorporates a substrate-guided relay 100. The system may be incorporated, for example, in the temple 1030 of frame 1020. For example, the temple 1030 may contain a projector that projects light through a substrate-guided relay 100 that allows a wearer of the eyewear 1000 to view images via the lenses 1010. The source of the images may also be within the frame 1020, may be attached to the frame 1020, or may be located within other components associated with a wearer of the eyewear 1000. For example, eyewear may be wired or wirelessly connected to a mobile device attached to a wearer of the eyewear. The mobile device may contain the image source, and transmit the images to a substrate-guided relay within the frame 1020 of the eyewear 1000 for presentation of the images to the wearer. Thus, users are able to view images on the lenses of the eyewear with minimal increases in weight due to the source of the images being remote to the eyewear.

CONCLUSION

As used herein, the terms "connected," "coupled," or any variant thereof, means any connection or coupling, either direct or indirect, between two or more elements. The above detailed description of embodiments of the system is not intended to be exhaustive or to limit the system to the precise form disclosed above. While specific embodiments of, and examples for, the system are described above for illustrative purposes, various equivalent modifications are possible within the scope of the system, as those skilled in the relevant art will recognize. Accordingly, the invention is not limited except as by the appended claims.

We claim:

1. A substrate-guided relay for use with a scanned beam image source, the substrate-guided relay comprising:
   an input coupler that receives multiple beams of light from a scanned beam image source and creates multiple copies of light from each of the multiple beams of light;
   an intermediate substrate, physically attached to the input coupler, that receives the multiple copies of light from the input coupler and transmits the multiple copies; and
   an output coupler, physically attached and located externally to the intermediate substrate, that receives the multiple transmitted copies from the intermediate substrate and outputs the multiple copies from the output coupler, wherein the output coupler is physically attached to the intermediate substrate via a partially reflective interface layer, and wherein reflectivity of the partially reflective interface layer varies as a function of a polarization of incident light.

2. The substrate-guided relay of claim 1, wherein the output coupler contains two or more partially reflective surfaces configured to output the multiple copies from the output coupler.

3. The substrate-guided relay of claim 2, wherein the partially reflective surfaces are substantially parallel with respect to one another.

4. The substrate-guided relay of claim 2, wherein the partially reflective surfaces are placed at an angle with respect to an optical axis of the intermediate substrate.

5. The substrate-guided relay of claim 1, wherein the output coupler is located between the intermediate substrate and a viewer of the outputted multiple copies.

6. The substrate-guided relay of claim 1, wherein the intermediate substrate is located between the output coupler and a viewer of the outputted multiple copies.

7. The substrate-guided relay of claim 1, wherein the partially reflective interface layer comprises a first area having a first reflectivity value and a second area having a second reflectivity value, wherein the first reflectivity value differs from the second reflectivity value.

8. The substrate-guided relay of claim 1, wherein the partially reflective interface layer comprises a continuously varied reflectivity value.

9. The substrate-guided relay of claim 1, wherein reflectivity of the partially reflective interface layer varies as a function of an angle of incident light.

10. The substrate-guided relay of claim 1, wherein the relay is attached to an eyeglass frame.

11. The substrate-guided relay of claim 1, further comprising:
    one or more reflective components physically attached to the input coupler that receives light from the scanned beam image source and directs the received light into the input coupler.

12. The substrate-guided relay of claim 1, wherein the intermediate substrate contains two or more partially reflective surfaces situated at a perpendicular angle in relation to outer surfaces of the intermediate substrate, wherein the partially reflective surfaces are configured to reflect some incident beams of light and transmit some incident beams of light.

13. Eyewear apparatus that presents images to a user of the eyewear, the apparatus comprising:
    two lenses;
    a frame, wherein the frame holds the two lenses substantially in front of the eyes of the user; and
    a substrate-guided relay at least partially contained within at least one of the two lenses, wherein the substrate-guided relay includes:
       an input coupler that receives multiple beams of light from a scanned beam image source and creates multiple copies of each of the beams of light
       an intermediate substrate, physically attached to the input coupler, that receives the multiple copies from the input coupler and transmits the multiple copies; and
       an output coupler, physically attached and located externally to the intermediate substrate, that receives the multiple transmitted copies from the intermediate substrate and outputs the multiple copies from the output coupler, wherein the output coupler is physically attached to the intermediate substrate via a partially reflective interface layer, and wherein reflectivity of the partially reflective interface layer varies as a function of a polarization of incident light.

14. The eyewear apparatus of claim 13, wherein the substrate-guided relay receives the multiple beams of light from a scanned beam image source located within the frame.

15. The eyewear apparatus of claim 13, wherein the substrate-guided relay receives the multiple beams of light from a scanned beam image source located within a device associated with the user and coupled to the substrate-guided relay.

16. The substrate-guided relay of claim 1, further comprising a homogenization component that causes the number of light beams within the light output from the output coupler to be greater than the number of light beams within the light received by the intermediate substrate.

17. A substrate-guided relay for use with a scanned beam image source, the substrate-guided relay comprising:
    an input coupler that receives multiple beams of light from a scanned beam image source and creates multiple copies of light from each of the multiple beams of light;
    an intermediate substrate, physically attached to the input coupler, that receives the multiple copies of light from the input coupler and transmits the multiple copies; and
    an output coupler, physically attached and located externally to the intermediate substrate, that receives the multiple transmitted copies from the intermediate substrate and outputs the multiple copies from the output coupler, wherein the output coupler is physically attached to the intermediate substrate via a partially reflective interface layer, and wherein reflectivity of the partially reflective interface layer varies as a function of a wavelength of incident light.

18. The substrate-guided relay of claim 17, further comprising a homogenization component that causes the number of light beams within the light output from the output coupler to be greater than the number of light beams within the light received by the intermediate substrate.

19. The substrate-guided relay of claim 17, wherein the output coupler contains two or more partially reflective surfaces configured to output the multiple copies from the output coupler.

20. The substrate-guided relay of claim 19, wherein the partially reflective surfaces are substantially parallel with respect to one another.

21. The substrate-guided relay of claim 19, wherein the partially reflective surfaces are placed at an angle with respect to an optical axis of the intermediate substrate.

22. The substrate-guided relay of claim 17, wherein the output coupler is located between the intermediate substrate and a viewer of the outputted multiple copies.

23. The substrate-guided relay of claim 17, wherein the intermediate substrate is located between the output coupler and a viewer of the outputted multiple copies.

24. The substrate-guided relay of claim 17, wherein the partially reflective interface layer comprises a first area having a first reflectivity value and a second area having a second reflectivity value, wherein the first reflectivity value differs from the second reflectivity value.

25. The substrate-guided relay of claim 17, wherein the partially reflective interface layer comprises a continuously varied reflectivity value.

26. The substrate-guided relay of claim 17, wherein reflectivity of the partially reflective interface layer varies as a function of an angle of incident light.

27. The substrate-guided relay of claim 17, wherein the relay is attached to an eyeglass frame.

28. The substrate-guided relay of claim 17, further comprising:
   one or more reflective components physically attached to the input coupler that receives light from the scanned beam image source and directs the received light into the input coupler.

29. The substrate-guided relay of claim 17, wherein the intermediate substrate contains two or more partially reflective surfaces situated at a perpendicular angle in relation to outer surfaces of the intermediate substrate, wherein the partially reflective surfaces are configured to reflect some incident beams of light and transmit some incident beams of light.

30. A substrate-guided relay for use with a scanned beam image source, the substrate-guided relay comprising:
   an input coupler that receives multiple beams of light from a scanned beam image source and creates multiple copies of light from each of the multiple beams of light;
   an intermediate substrate, physically attached to the input coupler, that receives the multiple copies of light from the input coupler and transmits the multiple copies;
   a cross coupler physically attached to the input coupler and located on a surface opposite the intermediate substrate that receives a beam of light from the input coupler, creates additional beams of light from the received light, and outputs the additional beams of light and the received beam back to the input coupler; and
   an output coupler, physically attached and located externally to the intermediate substrate, that receives the multiple transmitted copies from the intermediate substrate and outputs the multiple copies from the output coupler.

31. A display system, comprising:
a substrate-guided relay, wherein the substrate guided relay comprises:
   an input coupler that receives multiple beams of light from a scanned beam image source and creates multiple copies of light from each of the multiple beams of light;
   an intermediate substrate, physically attached to the input coupler, that receives the multiple copies of light from the input coupler and transmits the multiple copies; and
   an output coupler, physically attached and located externally to the intermediate substrate, that receives the multiple transmitted copies from the intermediate substrate and outputs the multiple copies from the output coupler, wherein the output coupler is physically attached to the intermediate substrate via a partially reflective interface layer, and wherein reflectivity of the partially reflective interface layer varies as a function of a polarization of incident light;
a light coupling apparatus located between the scanned beam image source and the input coupler, wherein the light coupling apparatus includes:
   a lens that collimates light received from the scanned beam image source;
   a beamsplitter that allows the collimated light to pass through at a first instance;
   a quarter-wave plate that changes polarization of the collimated light; and
   a MEMS scanning mirror that reflects the polarized light back towards the beamsplitter; wherein the beamsplitter reflects the polarized light towards the input coupler at a second instance.

* * * * *

UNITED STATES PATENT AND TRADEMARK OFFICE
CERTIFICATE OF CORRECTION

PATENT NO. : 7,589,901 B2
APPLICATION NO. : 11/775511
DATED : September 15, 2009
INVENTOR(S) : Christian Dean DeJong et al.

It is certified that error appears in the above-identified patent and that said Letters Patent is hereby corrected as shown below:

In the Specification

Column 1, line 3:

Add the following Government Rights Statement after the title and before the Background Section:

STATEMENT REGARDING FEDERALLY SPONSORED RESEARCH OR DEVELOPMENT

This invention was made with government support under Contract Number FA8650-06-C-6724 awarded by the U.S. Air Force. The government has certain rights in the invention.

Signed and Sealed this
Eighth Day of October, 2013

Teresa Stanek Rea
*Deputy Director of the United States Patent and Trademark Office*